Figure 1:
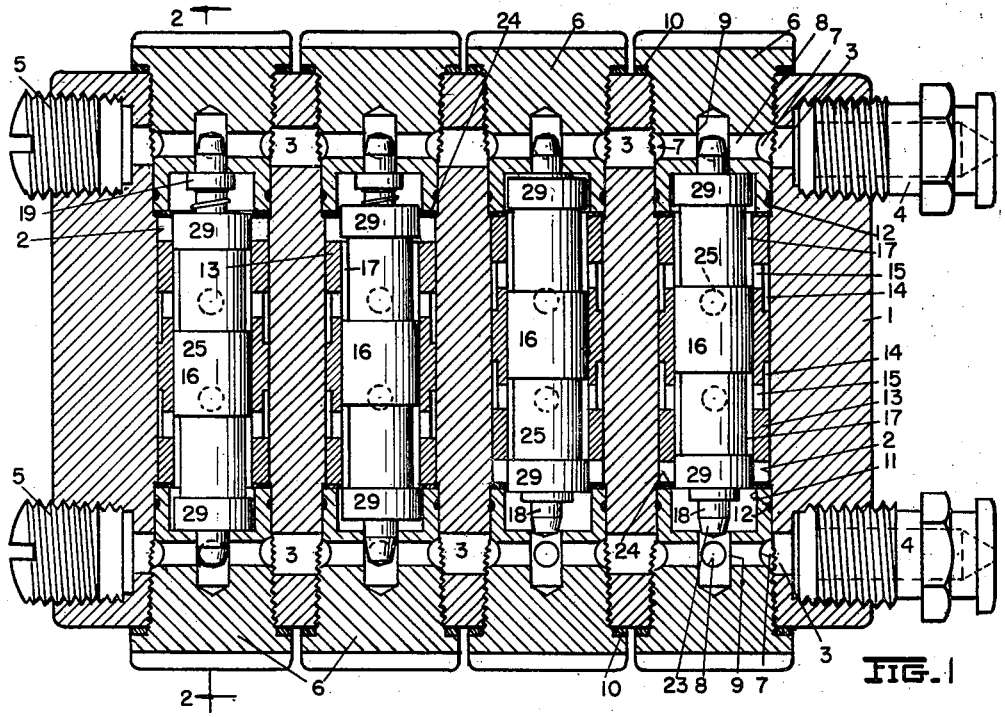

Oct. 27, 1942.　　　G. H. ACKER　　　2,300,330
LUBRICANT MEASURING VALVE
Filed Oct. 10, 1940　　　2 Sheets-Sheet 1

INVENTOR.
GEORGE H. ACKER
BY
Oberlin, Limbach & Day
ATTORNEYS.

Oct. 27, 1942.  G. H. ACKER  2,300,330
LUBRICANT MEASURING VALVE
Filed Oct. 10, 1940  2 Sheets-Sheet 2

INVENTOR.
GEORGE H. ACKER
BY
ATTORNEYS.

Patented Oct. 27, 1942

2,300,330

UNITED STATES PATENT OFFICE 2,300,330

LUBRICANT MEASURING VALVE

George H. Acker, Shaker Heights, Ohio, assignor to The Farval Corporation, Cleveland, Ohio, a corporation of Ohio Application October 10, 1940, Serial No. 360,599

16 Claims. (Cl. 184—7)

The present invention, relating as indicated to lubricant measuring valves, has particular reference to that type of valve wherein lubricant is alternately supplied from a dual lubricant pressure source and then delivered in measured quantities to the point to be lubricated, such as a bearing or journal. In lubricant measuring valves of such type, it is a requisite that the valve structure be not only capable of supplying the predetermined quantity of lubricant on each cycle or stroke of operation, but also capable of automatically disconnecting or closing off the particular pressure supply line not instantly in use.

The operating or movable elements of the measuring valve construction embodied in my present invention comprise a movable sleeve with a piston interfitting and movable therein. Such movable piston and sleeve structures are shown in my prior U. S. Patent No. 2,105,577 and Hillis U. S. Patent No. 2,105,595. My present invention constitutes an improvement over the disclosures of such prior patents, however, in that it achieves a much more simplified and compact construction, as well as involving a distinctive principle of operation.

It is, therefore, one of the objects of my invention to provide a lubricant measuring valve of the type and character indicated wherein but a single valve chamber is utilized and with the elimination of some of the transfer ports and passages heretofore found necessary.

Another object of my invention is to provide a valve construction of the movable sleeve and piston type wherein there is a minimum of flow resistance to the lubricant as it passes or is distributed from one individual valve to another.

Still another object of the invention is to provide a construction which readily lends itself to a manifold assembly, viz., an assembly wherein a plurality of individual valves are mounted in a common body or block and are adapted to receive their lubricant supply from a common supply line or manifold.

Additional objects and advantages of the invention shall become apparent as the following description proceeds.

To the accomplishment of the foregoing and related ends, said invention, then, consists of the elements hereinafter fully described and particularly pointed out in the claims.

The annexed drawings and the following description set forth in detail certain mechanism embodying the invention, such disclosed elements constituting, however, but one of various mechanical forms in which the principle of the invention may be used.

In said annexed drawings—

Figure 2:
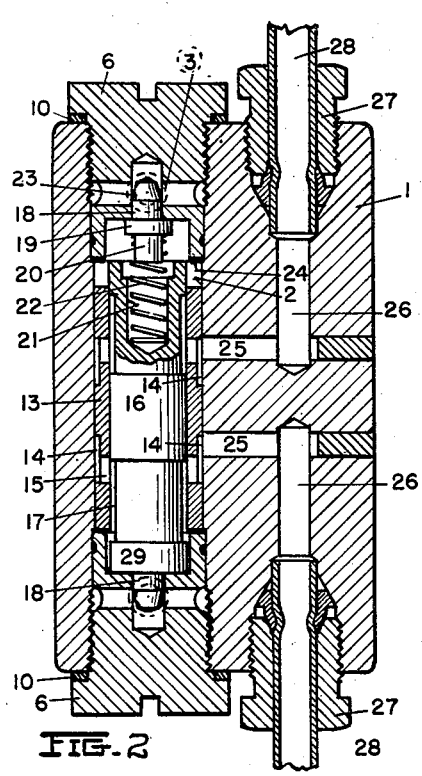
Figure 3:
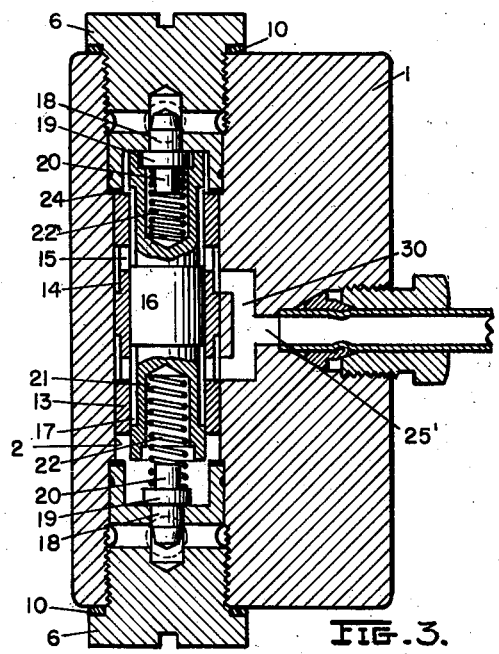
Figure 4:
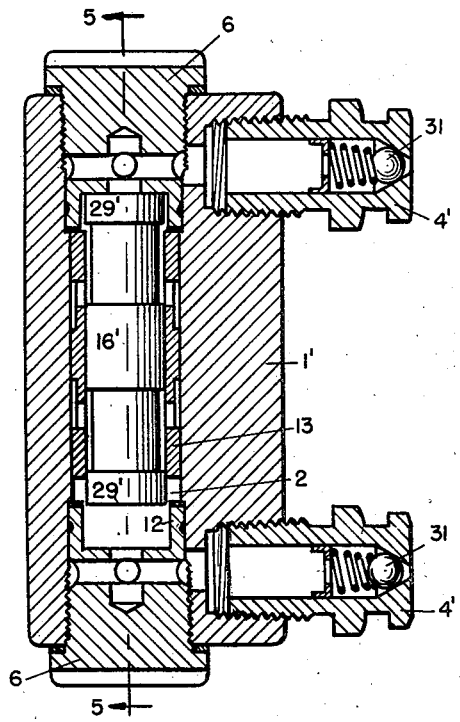
Figure 5:
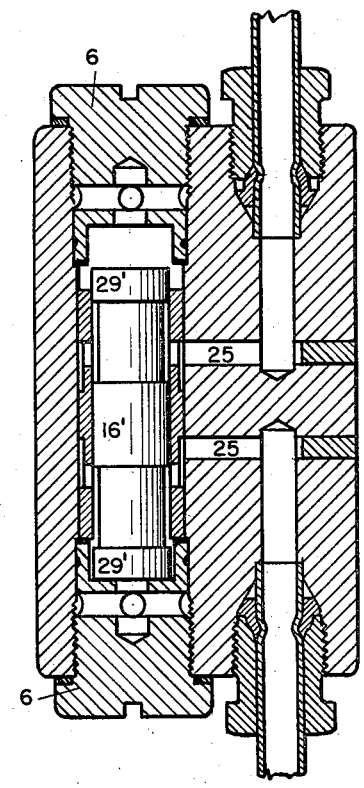

Fig. 1 is a sectional view of a manifold assembly wherein four individual measuring valves embodying the principle of my invention are mounted, the valves being shown in four different positions illustrating the cycle of operations of an individual valve; Fig. 2 is a sectional view taken upon a plane normal to that of Fig. 1 and substantially along the line 2—2 thereof; Fig. 3 is a view similar to that of Fig. 2 but showing the movable valve parts in a position at the opposite end of the cycle of operations as compared to the position of the parts shown in Fig. 2, and also illustrating a modified form of construction wherein a single, rather than dual discharge ports, is employed; Fig. 4 is a sectional view taken on a plane similar to Fig. 1 but showing another modified form of construction wherein the measuring valve is constructed in the form of a single unit, rather than multiple units in a manifold assembly; and Fig. 5 is a transverse sectional view taken substantially along the line 5—5 of Fig. 4.

Now referring more particularly to Figs. 1 and 2, there is shown therein a valve body 1, preferably fabricated from a single block of metal and in which there are located the individual valve chambers 2 (four in number in this instance). The ports 3 extend lengthwise through the valve body 1 adjacent each end of the valve chambers 2 and transversely thereof. Fittings or nipples 4 are connected to each end of the inlet ports 3. The opposite ends of the ports 3 are closed by the pipe plugs 5, or as will be obvious to those skilled in the art, threaded pipe or tube line connectors may be substituted for the plugs 5 and another valve body or manifold may thereby be connected to and operated from the valve body 1 shown. The fittings or nipples 4 may be of the type adapted to receive connection from a portable lubricant pressure gun or may be connected to pressure conduits leading to a main pressure source adapted to deliver lubricant pressure alternately to one conduit and then to the other.

The ends of the valve chambers 2 are closed to the exterior of the valve body 1 by means of the screw plugs 6 having circumferential grooves 7 in alignment with the inlet ports 3. Radial passages 8 lead from the grooves 7 to the central bores 9 in the screw plugs communicating with the end of the valve chambers 2. Sealing gaskets 10 are located between the head of the screw plugs 6 and the valve body 1 for perfecting the seal therebetween.

The screw plugs 6 have enlarged recesses 11 which form a part and continuation of the valve chambers 2. Sealing rings 12 are mounted between the opposed surfaces of the screw plugs 6 and the valve chambers 2.

A cylindrical sleeve 13 fits closely within the valve chamber 2 and is adapted to move longitudinally therein. The sleeve 13 has a pair of spaced grooves or channels 14 in its outer surface. Ports 15 through the wall of the sleeves 13 communicate with the grooves 14.

A piston valve 16 is movably fitted within the sleeve 13. A pair of grooves or channels 17 spaced from each other and from the ends of the piston valve 16 are located in the latter.

Check plungers 18 are carried by each end of the piston valve 16, having a collar portion 19 and stem portion 20 adapted to fit within the counterbores 21 in the ends of the pistons 16. A coiled compression spring 22 is mounted between the bottom of the counterbore 21 and the collar 19 of the plungers 18 and is adapted to urge the latter in an outward direction from the piston valves 16. The check plungers 18 are adapted to fit and seat within the central bores 9 of the screw plug 6. A tapered end portion 23 is provided on the plungers 18 in order to facilitate the initial fitting and alignment of the plungers 18 in the bores 9.

Sealing gaskets or washers 24 are located on the inner ends of the screw plugs 6 and are adapted to be contacted by the ends of the sleeve 13.

Discharge ports 25 are located in the wall of the valve chamber 2 and intermediate the ends of the latter. The discharge ports 25 are in alignment with the grooves 14 in the sleeve 13. It will be noted that the grooves 14 are of such longitudinal extent as to be in constant communication with the discharge ports 25, regardless of the position of the sleeve 13 in the valve chamber 2. The discharge ports 25 connect with the transverse passages 26, connected by means of the compression fittings 27 to the tubes or conduits 28 leading to the points or bearings to be lubricated.

It will be noted that the piston valve 16 has full diameter end portions or lands 29, whose opposed or inner shoulders are spaced apart a slightly greater distance than the length of the sleeve 13. Likewise, the outer diameter of the lands 29 are slightly less than the inner diameter of the recesses 11 forming a part of or the end portions of the valve chambers 2.

The operation of the above described device is conveniently illustrated by reference to the four different positions of the movable valve parts as represented in Fig. 1, and is as follows: First, assuming that all of the interior spaces within the valve body 1 are filled with lubricant and that pressure is being applied to the lower inlet port 3, such pressure will be exerted against the end of the plunger 18 of the piston valve 16 corresponding with the position of the first valve to the left in Fig. 1. This pressure then forces the check plunger 18 and the piston valve 16 in an upward direction to the second position shown in the second from the left of the valves in Fig. 1. In this second position it will be noted that the inner shoulder of the upper land 29 on the piston valve 16 has cleared and moved past the end of the sleeve 13. This permits lubricant from the upper end of the valve chamber 2 to pass through the space between the inner wall of the sleeve 13 and the groove 17, through the port 15 to the groove 14, to the uppermost discharge port 25 and thence to the bearing to be lubricated.

Upon continued application of pressure from the lower inlet port 3, the valve parts move further to the position shown in the third from the left of the valves in Fig. 1, wherein the sleeve 13 has moved upwardly until its end abuts against the end of the screw plug 6 and without disturbing the clearance or continuity of the passage of the lubricant out through the port 15 to the channel 14, to the upper discharge port 25. It will be noted that since the inner diameter of the end of the sleeve 13 is substantially equal to the outer diameter of the land 29 (sufficient to make a sliding fit therebetween), which, in turn, is less than the inner diameter of the chamber portion 11, a portion of the end of the sleeve 13 overlies the chamber portion 11 and is initially presented for the exertion of pressure from the chamber 3. As the sleeve 13 moves out of contact with the gasket 24, such pressure application is distributed over the entire end of the sleeve 13. It is in this manner that the sleeve 13 is caused to move in an upward direction. In the fourth and final stage of operation, both the sleeve 13 and the piston valve 16 reach the uppermost limits of their travel, while simultaneously, the space in the valve chamber 2, adjacent the lower end is filled with lubricant. It will be noted that the check plunger 18, in the fourth position of the measuring valve, as shown in Fig. 1, is substantially clear of the bore 9, thus facilitating free flow of lubricant into the valve chamber 2.

As lubricant pressure is discontinued or relieved from the lower inlet port 3, the pressure of the coil spring 22 is then effective to move the check plunger 18 back into the bore 9, thus closing off the lower end of the valve chamber 2 from the lower inlet port 3 and placing the valve in condition for an alternate cycle of operations wherein lubricant pressure is supplied to the upper inlet port 3. As the check plungers 18 move through their last increment of movement into the bores 9, they displace a small amount of lubricant from the chambers 11 out through the lower inlet ports 3, thus relieving whatever slight pressure there might have been in the lower end of the valve chambers 2 and further facilitating the first initial movement of the piston valve 16 on the alternate cycle of operations. Such small amount of displaced lubricant is received back into the lower inlet ports 3 and their connecting conduits, since the relief of pressure therein so permits.

It will thus be seen that the movement of both the sleeve 13 and the piston valve 16 are effective to displace the measured quantity of lubricant from the valve chamber 2 to the discharge ports 25, so that a maximum amount of lubricant discharge is obtained with a minimum amount of valve part movement.

In Fig. 3, I have shown the movable valve parts in position opposite to that shown in Fig. 2, or in a position corresponding to the righthand valve of Fig. 1. Fig. 3 also shows a modified form of construction wherein a single discharge port 25′ is provided in place of the dual ports 25, 25. This construction, it will be seen, is simply effected by expanding the juncture of the port 25′ with the valve chamber 2, as indicated at 30, so that it overlies both of the grooves 14. It will be readily apparent that in the case of the dual discharge port construction, as shown in Figs. 1 and 2, that two bearing connections will be serviced by each individual valve; whereas, only one bearing connection will be serviced by the construction shown in Fig. 3. However, the bearings connected to the single discharge port 25', as shown in Fig. 3, will receive twice as many charges of lubricant per complete cycle of operation of the valve as in the case of the dual discharge port connections.

In Figs. 4 and 5, I have shown a modified form of construction wherein a single valve unit, rather than a multiple number of valves, is mounted in the valve body. This construction permits the change of the location of the check valves from the ends of the movable piston valve to the pressure connection fittings or nipples. The interior construction of the valve proper is thus somewhat simplified. Thus, in Figs. 4 and 5, ball check valves 31 are mounted in the pressure line fittings or nipples 4' which connect to the valve body 1'. The construction of the valve chamber 2, the screw plugs 6 and the sleeve 13 and the discharge ports 25 remain the same as previously described in connection with Figs. 1 and 2. The piston valve 16', however, is of solid construction and does not carry any check plungers or have any recesses or counterbores in its ends. The lands 29' on each end of the piston valve 16', have plain outer ends and of course are of slightly less diameter than the inner diameter of the recesses 12 so that they may displace lubricant therefrom. The distance between the opposed or inner shoulders of the lands 29' is, of course, also greater than the length of the sleeve 13.

The operation of the form of construction shown in Figs. 4 and 5 is analogous to that previously described in connection with Figs. 1 and 2, so that it is not deemed necessary to repeat an explanation thereof.

Other forms may be employed embodying the features of my invention instead of the one here explained, change being made in the form or construction, provided the elements stated by any of the following claims or the equivalent of such stated elements be employed.

I, therefore, particularly point out and distinctly claim as my invention:

1. A lubricating measuring valve, comprising a valve chamber having each end connected to a lubricant pressure source for the alternate application of pressure, a discharge port located intermediate of the ends of said chamber, a sleeve valve movable and fitting within said chamber, ports through the wall of said sleeve valve in constant communication with said discharge port, and a piston valve movable and fitting within said sleeve valve both of said valves being movable upon such alternate pressure application, said sleeve and piston valves having clearance spaces between their longitudinally opposed surfaces and adjacent said ports in said sleeve valve, said clearance spaces communicating with said last-named ports.

2. A lubricating measuring valve, comprising a valve chamber having each end connected to a lubricant pressure source for the alternate application of pressure, a discharge port located intermediate of the ends of said chamber, a sleeve valve movable and fitting within said chamber and a piston valve movable and fitting within said sleeve valve both of said valves being movable upon such alternate pressure application, said piston valve being of greater length than said sleeve valve, said sleeve and piston valves having clearance spaces between their longitudinally opposed surfaces, said sleeve valve having openings therethrough in registry with said discharge port and communicating with said clearance spaces, the longitudinal ends of said spaces terminating at points inwardly removed from the ends of said piston valve, said piston valve being movable with respect to said sleeve valve to a position where said longitudinal ends of said spaces are beyond the ends of said sleeve valve.

3. A lubricating measuring valve, comprising a valve chamber having each end connected to a lubricant pressure source for the alternate application of pressure, a discharge port located intermediate of the ends of said chamber, a sleeve valve movable and fitting within said chamber, ports through the wall of said sleeve valve in constant communication with said discharge port, a piston valve movable and fitting within said sleeve valve both of said valves being movable upon such alternate pressure application, said piston valve being of greater length than said sleeve valve, said sleeve and piston valves having clearance spaces between their longitudinally opposed surfaces and adjacent said ports in said sleeve valve, said clearance spaces communicating with said last-named ports, the longitudinal ends of said spaces terminating at points inwardly removed from the ends of said piston valve, said piston valve being movable with respect to said sleeve valve to a position where said longitudinal ends of said spaces are beyond the ends of said sleeve valve.

4. A lubricating measuring valve, comprising a valve chamber having each end connected to a lubricant pressure source for the alternate application of pressure, a discharge port located intermediate of the ends of said chamber, check valves located in each of said ends of said chamber, a sleeve valve movable and fitting within said chamber, and a piston valve movable and fitting within said sleeve valve both of said valves being movable upon such alternate pressure application, said sleeve and piston valves having clearance spaces between their longitudinally opposed surfaces, and passageways in the wall of said sleeve valve leading from said clearance spaces to said discharge port for the passage of lubricant from the ends of said chamber to said discharge port.

5. A lubricating measuring valve, comprising a valve chamber having each end connected to a lubricant pressure source for the alternate application of pressure, a discharge port located intermediate of the ends of said chamber, check valves located in each of said ends of said chamber, a sleeve valve movable and fitting within said chamber, ports through the wall of said sleeve valve in constant communication with said discharge port, and a piston valve movable and fitting within said sleeve valve both of said valves being movable upon such alternate pressure application, said sleeve and piston valves having clearance spaces between their longitudinally opposed surfaces and adjacent said ports in said sleeve valve, said clearance spaces communicating with said last-named ports.

6. A lubricating measuring valve, comprising a valve chamber having each end connected to a lubricant pressure source for the alternate application of pressure, a discharge port located intermediate of the ends of said chamber, check valves located in each of said ends of said chamber, a sleeve valve movable and fitting within said chamber and a piston valve movable and fitting within said sleeve valve both of said valves being movable upon such alternate pressure application, said piston valve being of greater length than said sleeve valve, said sleeve and piston valves having clearance spaces between their longitudinally opposed surfaces, and passageways in the wall of said sleeve valve leading from said clearance spaces to said discharge port, the longitudinal ends of said spaces terminating at points inwardly removed from the ends of said piston valve, said piston valve being movable with respect to said sleeve valve to a position where said longitudinal ends of said spaces are beyond the ends of said sleeve valve.

7. A lubricating measuring valve, comprising a valve chamber having each end connected to a lubricant pressure source for the alternate application of pressure, a discharge port located intermediate of the ends of said chamber, check valves located in each of said ends of said chamber, a sleeve valve movable and fitting within said chamber, ports through the wall of said sleeve valve in constant communication with said discharge port, a piston valve movable and fitting within said sleeve valve both of said valves being movable upon such alternate pressure application, said piston valve being of greater length than said sleeve valve, said sleeve and piston valves having clearance spaces between their longitudinally opposed surfaces and adjacent said ports in said sleeve valve, said clearance spaces communicating with said last-named ports, the longitudinal ends of said spaces terminating at points inwardly removed from the ends of said piston valve, said piston valve being movable with respect to said sleeve valve to a position where said longitudinal ends of said spaces are beyond the ends of said sleeve valve.

8. A lubricating measuring valve, comprising a valve chamber having each end connected to a lubricant pressure source for the alternate application of pressure, a discharge port located intermediate of the ends of said chamber, a sleeve valve movable and fitting within said chamber and a piston valve movable and fitting within said sleeve valve both of said valves being movable upon such alternate pressure application, said piston valve being of greater length than said sleeve valve, the inner walls of the terminal end portions of said chamber having a diameter greater than the outer diameter of the ends of said piston valve and less than the outer diameter of said sleeve valve, said sleeve and piston valves having clearance spaces between their longitudinally opposed surfaces, and ports in said sleeve valve communicating with said clearance spaces and with said discharge port for the passage of lubricant from adjacent the ends of said sleeve and piston valves to said discharge port.

9. A lubricating measuring valve, comprising a valve chamber having each end connected to a lubricant pressure source for the alternate application of pressure, a discharge port located intermediate of the ends of said chamber, a sleeve valve movable and fitting within said chamber and a piston valve movable and fitting within said sleeve valve both of said valves being movable upon such alternate pressure application, said piston valve being of greater length than said sleeve valve, the inner walls of the terminal end portions of said chamber having a diameter greater than the outer diameter of the ends of said piston valve and less than the outer diameter of said sleeve valve, said sleeve and piston valves having clearance spaces between their longitudinally opposed surfaces, and passageways in the wall of said sleeve valve leading from said clearance spaces to said discharge port for the passage of lubricant from adjacent the ends of said sleeve and piston valves to said discharge port, the longitudinal ends of said clearance spaces terminating at points inwardly removed from the ends of said piston valve, said piston valve being movable with respect to said sleeve valve to a position where said longitudinal ends of said spaces are beyond the ends of said sleeve valve.

10. A lubricating measuring valve, comprising a valve chamber having each end connected to a lubricant pressure source for the alternate application of pressure, a discharge port located intermediate of the ends of said chamber, check valves located in each of said ends of said chamber, a sleeve valve movable and fitting within said chamber and a piston valve movable and fitting within said sleeve valve both of said valves being movable upon such alternate pressure application, said piston valve being of greater length than said sleeve valve, the inner walls of the terminal end portions of said chamber having a diameter greater than the outer diameter of the ends of said piston valve and less than the outer diameter of said sleeve valve, said sleeve and piston valves having clearance spaces between their longitudinally opposed surfaces, and passageways in the wall of said sleeve valve leading from said clearance spaces to said discharge port for the passage of lubricant from adjacent the ends of said sleeve and piston valves to said discharge port, the longitudinal ends of said clearance spaces terminating at points inwardly removed from the ends of said piston valve, said piston valve being movable with respect to said sleeve valve to a position where said longitudinal ends of said spaces are beyond the ends of said sleeve valve.

11. A lubricant measuring valve, comprising a valve chamber, an inlet port in each end of said chamber adapted to be alternately connected to a lubricant pressure source, a pair of discharge ports spaced from each other and located intermediate the ends of said chamber, a sleeve valve movable and fitting within said chamber, a piston valve movable and fitting within said sleeve valve, check valve plungers operable in each of said inlet ports, said plungers being adapted to fit within the ends of said piston valve, compression springs mounted between said plungers and said piston valve, annular grooves in said piston valve spaced from each other and from the ends of said piston valve, and ports through the wall of said sleeve valve in constant communication with each of said discharge ports and with said grooves, said sleeve valve being shorter than said piston valve, whereby upon movement of said sleeve and piston valves under pressure from one of said inlet ports, said other inlet port is closed by one of said plungers, and a predetermined quantity of lubricant is displaced from the ends of said sleeve and piston valves adjacent said last-named inlet port and transferred through one of said grooves and one of said ports in said sleeve to one of said discharge ports.

12. A lubricant measuring valve, comprising a valve chamber, an inlet port in each end of said chamber adapted to be alternately connected to a lubricant pressure source, a pair of discharge ports spaced from each other and located intermediate the ends of said chamber, a sleeve valve movable and fitting within said chamber, a piston valve movable and fitting within said sleeve valve, check valve plungers operable in each of said inlet ports, said plungers being adapted to fit within the ends of said piston valve, compression springs mounted between said plungers and said piston valve, annular grooves in said piston valve spaced from each other and from the ends of said piston valve, and ports through the wall of said sleeve valve in constant communication with each of said discharge ports and with said grooves, said piston valve being of greater length than said sleeve valve, the longitudinal ends of said grooves terminating at points inwardly of the ends of said piston valve, said piston valve being movable with respect to said sleeve valve to a position where said longitudinal ends of said grooves are beyond the ends of said sleeve valve, whereby upon movement of said sleeve and piston valves under pressure from one of said inlet ports, said other inlet port is closed by one of said plungers, and a predetermined quantity of lubricant is displaced from the ends of said sleeve and piston valves adjacent said last-named inlet port and transferred through one of said grooves and one of said ports in said sleeve to one of said discharge ports.

13. A lubricant measuring valve, comprising a valve chamber, an inlet port in each end of said chamber adapted to be alternately connected to a lubricant pressure source, a pair of discharge ports spaced from each other and located intermediate the ends of said chamber, a sleeve valve movable and fitting within said chamber, a piston valve movable and fitting within said sleeve valve, check valve plungers operable in each of said inlet ports, said plungers being adapted to fit within the ends of said piston valve, compression springs mounted between said plungers and said piston valve, annular grooves in said piston valve spaced from each other and from the ends of said piston valve, and ports through the wall of said sleeve valve in constant communication with each of said discharge ports and with said grooves, said sleeve valve being shorter than said piston valve, the inner walls of the terminal end portions of said chamber having a diameter greater than the outer diameter of the ends of said piston valve and less than the outer diameter of said sleeve valve, whereby upon movement of said sleeve and piston valves under pressure from one of said inlet ports, said other inlet port is closed by one of said plungers, and a predetermined quantity of lubricant is displaced from the ends of said sleeve and piston valves adjacent said last-named inlet port and transferred through one of said grooves and one of said ports in said sleeve to one of said discharge ports.

14. A lubricating measuring valve, comprising a valve chamber having each end connected to a lubricant pressure source for the alternate application of pressure, a discharge port located intermediate of the ends of said chamber, and sleeve and piston valve means reciprocable in said chamber under such alternate pressure application for receiving lubricant under pressure from one end thereof and emitting a predetermined quantity of lubricant from the other end of said chamber to said discharge port, longitudinally spaced contacting surfaces between the sleeve and piston of said valve means, said sleeve having openings therethrough in registry with said discharge port, and the spaces between said contacting surfaces forming passageways from the ends of said chamber to said openings in said sleeve.

15. A lubricating measuring valve, comprising a valve chamber having each end connected to a lubricant pressure source for the alternate application of pressure, a discharge port located intermediate of the ends of said chamber, check valves located in each of said ends of said chamber, and sleeve and piston valve means reciprocable in said chamber under such alternate pressure application for receiving lubricant under pressure from one end thereof and emitting a predetermined quantity of lubricant from the other end of said chamber to said discharge port, longitudinally spaced contacting surfaces between the sleeve and piston of said valve means, said sleeve having openings therethrough in registry with said discharge port, and the spaces between said contacting surfaces forming passageways from the ends of said chamber to said openings in said sleeve.

16. A lubricating measuring valve, comprising a valve chamber having each end connected to a lubricant pressure source for the alternate application of pressure, a discharge port located intermediate of the ends of said chamber, a sleeve valve movable and fitting within said chamber, and a piston valve movable and fitting within said sleeve valve, both of said valves being movable upon such alternate pressure application, said sleeve and piston valves having clearance spaces between their longitudinally opposed, mutually contacting surfaces, said sleeve valve having openings therethrough in registry with said discharge ports and communicating with said clearance spaces, the latter being adapted to be opened to ends of said valve chamber on relative movement of said sleeve and piston valves for the passage of lubricant from the ends of said chamber to said discharge port.

GEORGE H. ACKER.